United States Patent
Pieussergues et al.

(10) Patent No.: US 8,661,828 B2
(45) Date of Patent: *Mar. 4, 2014

(54) SEALING BETWEEN A COMBUSTION CHAMBER AND A TURBINE NOZZLE IN A TURBOMACHINE

(75) Inventors: Christophe Pieussergues, Nangis (FR); Denis Jean Maurice Sandelis, Nangis (FR)

(73) Assignee: SNECMA, Paris (FR)

(*) Notice: Subject to any disclaimer, the term of this patent is extended or adjusted under 35 U.S.C. 154(b) by 308 days.

This patent is subject to a terminal disclaimer.

(21) Appl. No.: 13/121,902

(22) PCT Filed: Oct. 5, 2009

(86) PCT No.: PCT/FR2009/001183
§ 371 (c)(1),
(2), (4) Date: Mar. 30, 2011

(87) PCT Pub. No.: WO2010/043778
PCT Pub. Date: Apr. 22, 2010

(65) Prior Publication Data
US 2011/0179798 A1    Jul. 28, 2011

(30) Foreign Application Priority Data
Oct. 15, 2008   (FR) ..................... 08 05700

(51) Int. Cl.
*F02C 1/00* (2006.01)
*F02G 3/00* (2006.01)
(52) U.S. Cl.
USPC .............. 60/752; 60/753; 60/754; 60/755; 60/756; 60/757; 60/758; 60/760; 60/805; 60/806; 277/650; 277/647; 277/626; 277/379; 277/529; 277/530

(58) Field of Classification Search
USPC ............ 60/752–760, 805, 806; 277/650, 647, 277/626, 379, 529, 530
See application file for complete search history.

(56) References Cited

U.S. PATENT DOCUMENTS 5,470,198 A    11/1995  Harrogate et al.
5,716,052 A *   2/1998  Swensen et al. .............. 277/647
(Continued)

FOREIGN PATENT DOCUMENTS

EP    1 296 023    3/2003
JP    2003 148 621   5/2003
(Continued)

OTHER PUBLICATIONS

International Search Report issued Dec. 30, 2009 in PCT/FR2009/001183 filed Oct. 5, 2009.

*Primary Examiner* — Phutthiwat Wongwian
*Assistant Examiner* — Craig Kim
(74) *Attorney, Agent, or Firm* — Oblon, Spivak, McClelland, Maier & Neustadt, L.L.P.

(57) ABSTRACT

A turbomachine including an annular combustion chamber, a sectorized turbine nozzle arranged at an outlet from the chamber, and a sealing mechanism interposed axially between the chamber and the nozzle, the sealing mechanism including an annular gasket that is axially resilient. The gasket includes a first axial bearing mechanism for bearing against a downstream end of the chamber and a downstream annular lip that is sectorized, each sector of the downstream lip being in alignment with a sector of the nozzle and including a second axial bearing mechanism for bearing against an upstream end of the nozzle sector.

18 Claims, 4 Drawing Sheets

(56) References Cited

U.S. PATENT DOCUMENTS

| | | | |
|---|---|---|---|
| 6,199,871 B1 * | 3/2001 | Lampes | 277/614 |
| 6,418,727 B1 | 7/2002 | Rice et al. | |
| 6,450,762 B1 * | 9/2002 | Munshi | 415/138 |
| 6,547,257 B2 * | 4/2003 | Cromer | 277/630 |
| 7,152,864 B2 * | 12/2006 | Amos et al. | 277/650 |
| 2003/0046940 A1 | 3/2003 | Matsuda et al. | |
| 2004/0239050 A1 | 12/2004 | Antunes et al. | |
| 2006/0010879 A1 * | 1/2006 | Aumont et al. | 60/796 |
| 2007/0025841 A1 * | 2/2007 | Milazar | 415/134 |
| 2007/0040336 A1 | 2/2007 | Sun et al. | |

FOREIGN PATENT DOCUMENTS

| | | |
|---|---|---|
| WO | 01 71175 | 9/2001 |
| WO | 2004 097 270 | 11/2004 |

\* cited by examiner

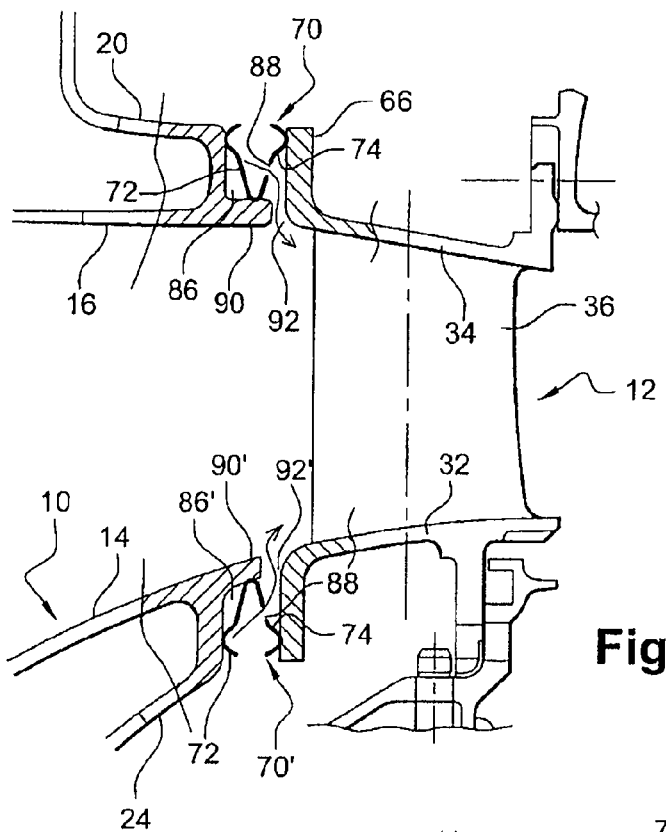
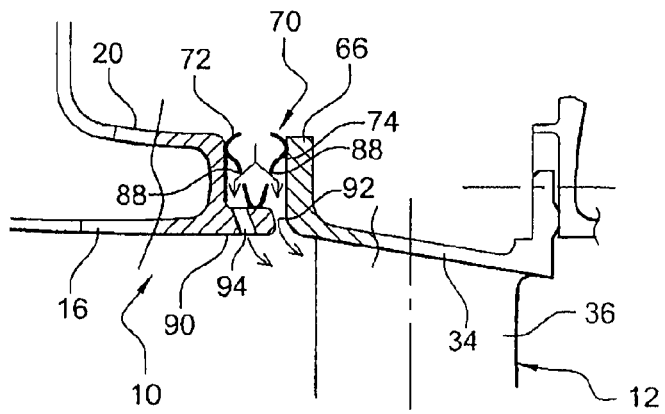
Fig. 7
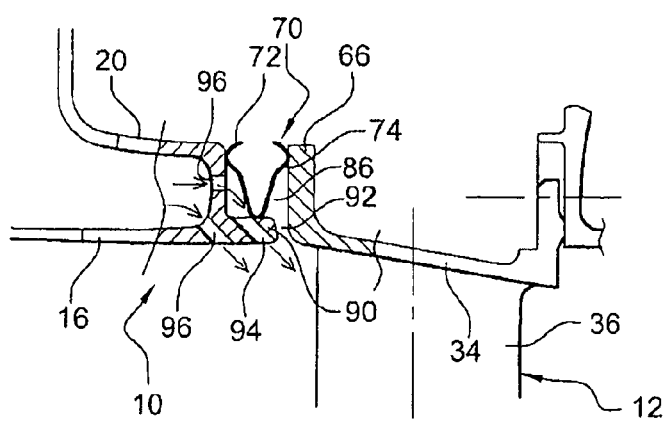
Fig. 8

SEALING BETWEEN A COMBUSTION CHAMBER AND A TURBINE NOZZLE IN A TURBOMACHINE

BACKGROUND OF THE INVENTION

1. Field of the Invention

The present invention relates to sealing means between an annular combustion chamber and a turbine nozzle in a turbomachine such as an airplane turboprop or turbojet.

A turbomachine combustion chamber comprises two coaxial walls forming surfaces of revolution constituting respectively an inner wall and an outer wall that define the combustion chamber between them, each of which walls is connected at its downstream end to a respective annular flange for fastening to a casing of the turbomachine.

A sectorized turbine nozzle is arranged at the outlet from the chamber and comprises one or more annular platforms (for example two platforms comprising respectively an inner platform and an outer platform), which platforms are connected together by substantially radial vanes. The inner and outer platforms of the nozzle extend substantially axially in line with the inner and outer walls respectively of the chamber. The upstream ends of the nozzle platforms are axially separated from the downstream ends of the chamber walls by annular spaces so that the chamber walls and the nozzle platforms are capable of expanding freely while the turbomachine is in operation.

Sealing means are interposed axially between the downstream ends of the chamber walls and the upstream ends of the platforms of the nozzle in order to limit the outward passage of hot gas from the inside of the chamber towards the outside of the chamber via the above-mentioned annular spaces between the chamber and the nozzle.

First sealing means are mounted between the downstream end of the outer wall of the chamber (or between the fastener flange of said wall) and the upstream end of the outer platform of the nozzle in order to limit the radially-outward passage of hot gas between the chamber and the nozzle. Second sealing means are mounted between the downstream end of the inner wall of the chamber (or between the fastener flange of said wall) and the upstream end of the inner platform of the nozzle in order to limit the inward radial passage of hot gas between the chamber and the nozzle.

2. Description of the Related Art

In the prior art, each of the sealing means is formed by strips of circumferential orientation that are placed circumferentially beside one another around the axis of the chamber, each strip being fastened to the upstream end of the platform of a nozzle sector, and bearing against the downstream end of the chamber wall or against its fastener flange. Each of the sealing means further includes gasket covers that are mounted between the adjacent strips in order to close the spaces between the strip, and thus limit the passage of hot gas through those spaces.

The number of strips is equal to the number of nozzle sectors, and each strip is fastened on a nozzle sector by two rivets and is associated with a spring that urges it axially towards the chamber. When the turbine nozzle is made up of eighteen sectors, each of the sealing means comprises eighteen strips, eighteen gasket covers, eighteen springs, and thirty-six rivets, which constitutes a large number of parts. Those sealing means are therefore relatively complex and the time required for mounting them is relatively lengthy. Furthermore, those sealing means are not very reliable.

Because of differential thermal expansions between the chamber and the nozzle sectors, and because of the vibration to which the various parts of the sealing means are subjected in operation, it is found that the strips do not always bear against the chamber, in particular during transient operating conditions of the turbomachine. In operation, the nozzle sectors may become slightly offset in the axial direction relative to one another, thereby causing the strips to be separated from the chamber and thus preventing said strips from bearing against the chamber. In the prior art, the strips are caused to bear against the chamber along a circular line, which line can thus become interrupted as a result of the above-described phenomena. It has also been observed that the gasket covers then do not provide good sealing between the strips and that hot gas can pass between the strips to the outside of the chamber. The downstream end of the chamber wall and the fastener flange of said wall are then exposed locally to high temperatures, thereby giving rise to stresses and increasing the risk of cracking appearing in said elements.

BRIEF SUMMARY OF THE INVENTION

A particular object of the invention is to provide a solution to those problems that is simple, effective, and inexpensive.

To this end, the invention provides a turbomachine having an annular combustion chamber, a sectorized turbine nozzle arranged at the outlet from the chamber, and sealing means interposed axially between the chamber and the nozzle, the turbomachine being characterized in that the sealing means comprise an gasket that is axially resilient, the gasket including axial bearing means for bearing against a downstream end of the chamber and a downstream annular lip that is sectorized, each sector of the downstream lip being in alignment with a sector of the nozzle and including axial bearing means for bearing against an upstream end of the nozzle sector.

The sealing gasket of the invention comprises both means for bearing resiliently against the chamber and means for bearing resiliently against the nozzle sectors, thereby providing good sealing between the chamber and the nozzle. The means for bearing against the chamber may be formed by an upstream annular lip that is not sectorized and that bears against the chamber continuously all around the circumference of the chamber. The means for bearing against the nozzle are formed by a downstream annular lip that is sectorized and that has its sectors bearing against the sectors of the nozzle along a circumferential line or surface. The sectors of the lip are free to move independently of one another and are therefore capable of tracking the movements of the nozzle sectors in operation, while maintaining permanent bearing thrust thereagainst.

The gasket of the invention is also an independent part that is interposed between the chamber and the nozzle. It does not require any particular mounting or fastener means.

The sealing gasket of the invention may be mounted between the downstream end of each wall (or the fastener flange of said wall) and the upstream end of the corresponding platform of the nozzle. The two gaskets are then coaxial, with the sealing gasket that is situated radially on the inside presenting a diameter that is smaller than that of the gasket that is situated radially on the outside.

According to another characteristic of the invention, the gasket is mounted with cold axial prestress between the chamber and the nozzle. Since the sectors of the downstream lips are elastically deformable independently of one another, the gasket enables good sealing to be provided between the chamber and the nozzle under all operating conditions, while also allowing these elements to move relative to one another as a result of the vibration and of the differential thermal expansions to which they are subjected.

The gasket is preferably in the form of a single annular part. It is therefore easy to mount and to replace should it become worn. It may present a section that is V-, W-, WV-, WW-, or Ω-shaped. By way of example, the lips of the gasket are connected together by a corrugated portion of the gasket so as to form a gasket of W, WV, or WW section.

The axial bearing means of each lip of the gasket advantageously include an annular bearing surface that presents a convex rounded shape. The gasket bears against the chamber and against the nozzle via annular surfaces, and not merely by bearing in linear manner as in the prior art. The bearing of the gasket against those elements therefore takes place over an area that is larger than in the prior art, thereby significantly improving the sealing between the chamber and the nozzle.

The axial bearing means of the lips may be formed at the free end portions of the lips, these end portions presenting a section of curved shape with the convex sides thereof being oriented in substantially opposite directions, e.g. upstream for the upstream lip and downstream for the downstream lip.

The gasket may also include radial bearing means for bearing against the chamber and/or the nozzle for the purpose of centering the gasket. The bearing of the gasket against the chamber and the nozzle, in axial and radial directions, suffices to hold the gasket in position. The gasket therefore does not require any particular fastener means of the rivet or like type.

The downstream lip of the gasket may include a number of sectors that is equal to or greater than the number of nozzle sectors.

The sectors of the downstream lip are preferably defined by calibrated through slots in the lip. The dimensions of these slots are determined in particular so as to allow cooling air to pass in controlled manner from the outside towards the inside of the chamber. The gasket may also include calibrated orifices for passing ventilation air.

The downstream end of the chamber and/or the upstream end of the nozzle may include orifices for passing air in order to feed air to the annular enclosure in which the gasket is enclosed and/or to discharge air from said enclosure.

The invention also provides an axially resilient annular sealing gasket for a turbomachine as described above, the gasket being characterized in that it is made as a single part and includes two annular lips, one of which includes radial through slots defining, between them, lip sectors that are capable of moving freely independently of one another. The gasket may include all or some of the above-mentioned characteristics of the gasket described above with reference to a turbomachine.

BRIEF DESCRIPTION OF THE DRAWINGS

The invention can be better understood and other characteristics, details, and advantages of the present invention appear more clearly on reading the following description made by way of non-limiting example and with reference to the accompanying drawings, in which:

FIGS. 6 to 9 are fragmentary diagrammatic half-views in axial section of a turbomachine fitted with variant embodiments of the annular sealing gasket of the invention.

DETAILED DESCRIPTION OF THE INVENTION

Figure 1:
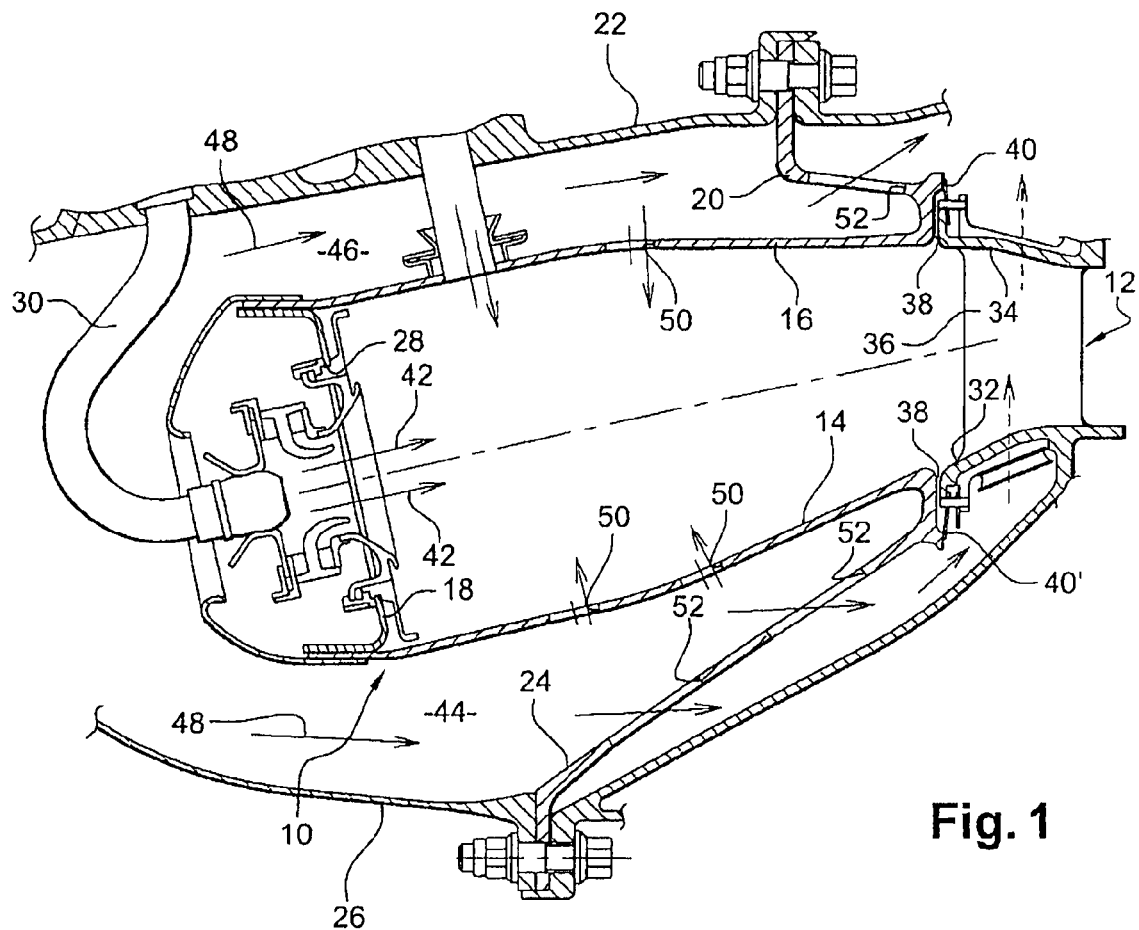
FIG. 1 is a diagrammatic half-view in axial section of a combustion chamber and a turbine nozzle of a turbomachine, with sealing means being mounted therebetween using the prior art technique.

Reference is made initially to FIG. 1 that shows an annular combustion chamber 10 of a turbomachine, such as an airplane turboprop or turbojet, which combustion chamber is arranged downstream from a compressor and a diffuser (not shown), and upstream from an inlet nozzle 12 of a high pressure turbine 10.

The combustion chamber 10 has inner and outer walls 14 and 16 forming surfaces of revolution that extend one inside the other and that are connected together at their upstream ends by an annular chamber end wall 18. The outer wall 16 of the chamber is connected at its downstream end to an outer annular flange 20 that is fastened at its outer periphery to an outer casing 22 of the chamber, and its inner wall 14 is connected at its downstream end to an inner annular flange 24 that is fastened at its inner periphery to an inner casing 26 of the chamber.

The annular chamber end wall 18 has openings 28 for passing air coming from the compressor, together with fuel delivered by injectors 30 that are fastened to the outer casing 22.

The nozzle 12 is fastened downstream from the chamber by suitable means and comprises inner and outer annular platforms 32 and 34 that extend one inside the other and that are connected together by substantially radial vanes 36. The outer platform 34 of the nozzle 12 is axially in alignment with the downstream end portion of the outer wall 16 of the chamber, and its inner platform 32 is axially in alignment with the downstream end portion of the inner wall 14 of the chamber.

The nozzle 12 is sectorized and comprises a plurality of sectors placed one after another around a circumference centered on the axis of revolution of the chamber. By way of example, there are eighteen sectors making up the nozzle.

The platforms 32 and 34 of the nozzle co-operate with the chamber fastener flanges 20 and 24 to define two annular spaces 38, respectively an inner space and an outer space, each opening out at one end to the inside of the chamber and each closed at its other end by sealing means 40, 40' mounted between the platforms 32, 34 and the flanges 20, 24.

A fraction of the air flow supplied by the compressor situated upstream passes through the openings 28 in the wall 18 and feeds the combustion chamber 10 (arrows 42), with the remaining fraction of the air flow feeding inner and outer annular flowsections 44 and 46 that pass around the chamber (arrows 48).

The inner flowsection 44 is formed between the inner casing 26 and the inner wall 14 of the chamber, and the air that passes through this space is shared between a flow that penetrates into the chamber 10 via orifices 50 in the inner wall 14, and a flow that passes through holes 52 in the inner flange 24 of the chamber, in particular to cool the inner sealing means 40' and the outer periphery of the flange 24 connected to the wall 14 of the chamber. A fraction of the air that passes through the flange 24 then passes through the nozzle 12 by passing radially outwards via cavities inside the vanes 36 of the nozzle.

The outer flowsection 46 is formed between the outer casing 22 and the outer wall 16 of the chamber, and the air that passes through this space is shared between a flow that penetrates into the chamber 10 via orifices 50 in the outer wall 16 and a flow that passes through holes 52 in the outer flange 20 and is added to the flow of air that passes through the vanes 36 of the nozzle, this air serving in particular to cool the outer sealing means 40 and the inner periphery of the flange 20.

Figure 2:
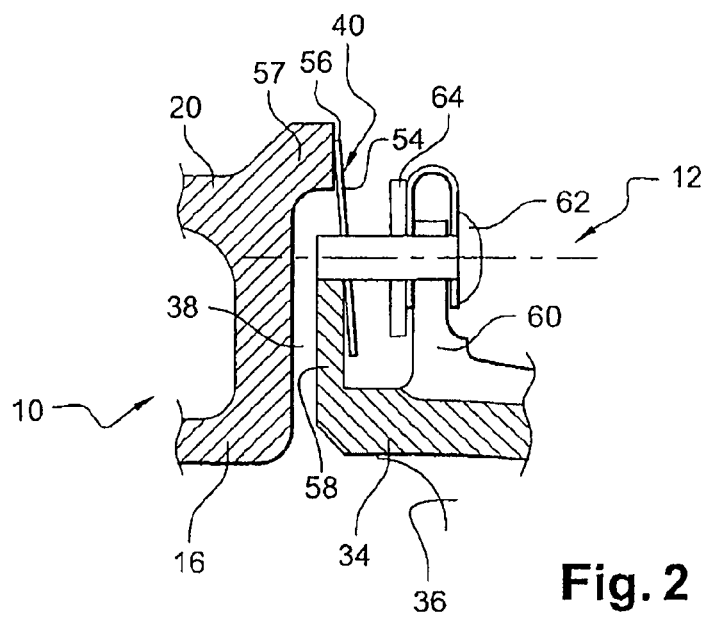
FIG. 2 is a view on a larger scale of a portion of FIG. 1.

FIG. 2 is a view on a larger scale of the outer sealing means 40. The sealing means 40 comprise strips 54 that are disposed circumferentially beside one another around the longitudinal axis of the chamber, and that have gasket covers (not shown) mounted thereon. Each strip 54 is formed by a small plane plate of circumferential orientation that extends substantially upstream and inwards when in the mounted position. It is fastened by riveting in its middle portion to a nozzle sector 12, and its outer peripheral edge 56 bears against a radial face of a cylindrical rim 57 of the flange 20.

The platform 34 of the sector of the nozzle 12 includes two radial walls 58 and 60 at its upstream end that are axially spaced apart from each other and that are used for mounting the means 40. These walls 58 and 60 include axial orifices for passing the fastener rivets 62 of the strips 54.

The more upstream wall 58 of the platform 34 cooperates with the fastener flange 20 of the wall 16 to define the annular space 38. The means 40 are mounted between the two walls 58 and 60. They bear against the downstream radial face of the wall 58 and they are urged upstream by a spring 64 mounted between said means and the wall 60 of the platform 34.

The inner sealing means 40' are similar to the outer sealing means 40. The sealing imparted by these means is nevertheless not satisfactory, as described above.

The invention provides a simple solution to the problems of the prior art by means of a one-piece annular gasket that includes means for bearing axially against the chamber 10 and against the nozzle 12 and that does not require particular means for mounting and/or fastening it to the chamber and the nozzle.

Figure 3:
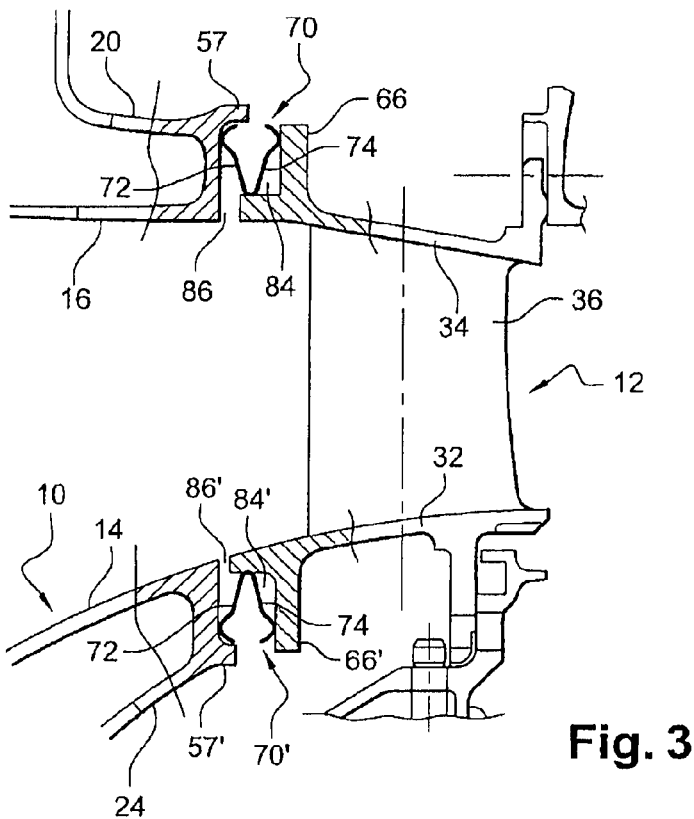
FIG. 3 is a diagrammatic half-view in axial section of annular sealing gaskets of the invention, mounted between a combustion chamber and a turbine nozzle of a turbomachine.
Figure 4:
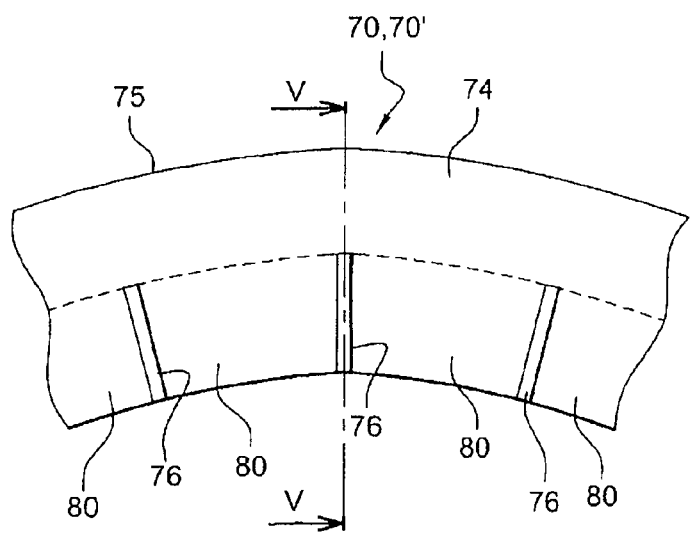
FIG. 4 is a fragmentary diagrammatic face view on a larger scale of one of the FIG. 3 sealing gaskets seen from downstream.
Figure 5:
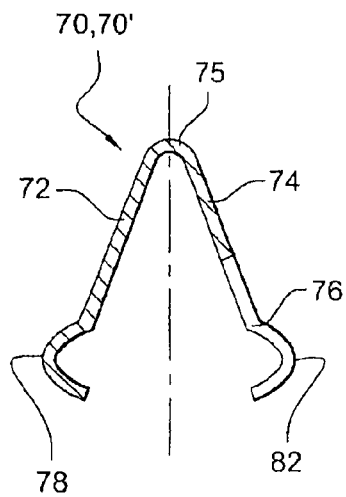
FIG. 5 is a section view on line V-V of FIG. 4.

In the embodiment shown in FIGS. 3 to 5, the gasket 70, 70' has a substantially V-shaped section and includes an upstream annular lip 72 and a downstream annular lip 74 for bearing axially against the chamber 10 and the nozzle 12, respectively. The lips 72 and 74 are connected together by a rounded middle portion 75 of the gasket. The outer sealing gasket 70 is mounted in such a manner that its opening opens radially outwards, and the inner gasket 70' is mounted so that its opening opens radially inwards.

The upstream lip 72 of the gasket is continuous over 360° (i.e. it is not sectorized) and in the proximity of its free peripheral edge (remote from the middle portion 75) it includes annular means 78 for bearing axially against the chamber 10.

The bearing means 78 of the lip 72 of the gasket present a C-shaped section with its convex side facing axially upstream, i.e. towards the chamber 10. These bearing means thus present a convex curved annular surface on the upstream side that comes to bear axially against the flange 20 of the chamber.

The downstream lip 74 of the gasket is sectorized, this sectorization being obtained by a plurality of radial slots 76 formed in the lip 74 from its free peripheral edge. These slots 76 are regularly distributed around the axis of the gasket, and by way of example they extend over about half of the radial dimension of the lip 74.

The gasket 70, 70' is elastically deformable, in particular in the axial direction, so that the lips 72, 74 can be moved apart and towards each other elastically in operation, and so that the sectors 80 of the downstream lip (as defined by the slots 76 and the dashed line in FIG. 4) can be moved axially upstream and downstream independently of the other sectors of the same lip.

The number of these sectors 80 is preferably equal to the number of sectors making up the nozzle 12, and each sector 80 presents an angular extent around the axis of the gasket that is substantially equal to the angular extent of a sector of the nozzle 12. Each sector 80 of the lip 74 is axially in alignment with a sector of the nozzle 12 so that each sector 80 co-operates with and bears against a single sector of the nozzle 12. To prevent the gasket 70, 70' moving in a circumferential direction in operation and to prevent the sectors 80 of the lip 74 being offset in a circumferential direction relative to the sectors of the nozzle 12, the gasket may be provided with anti-rotation means of the lug or like type that may be provided on the gasket to co-operate with complementary means of the chamber or of the nozzle, or vice versa.

Each sector 80 of the lip 74 includes means 82 in the vicinity of its free peripheral edge for bearing axially against a sector of the nozzle 12. These bearing means 82 present a C-shaped section with its convex side oriented axially downstream beside the nozzle 12. Thus, on their downstream sides, they present a convex curved annular surface for bearing against the sectors of the nozzle 12.

In the example shown, the outer platform 34 of the nozzle 12 includes a radial annular wall 66 in the vicinity of its upstream end, which radial wall 66 cooperates with a radial annular portion of the flange 20 to define an annular enclosure 84 in which the outer gasket 70 is housed. This enclosure 84 is defined radially in part at its outer periphery by a cylindrical rim 57 of the flange 20, and at its inner periphery by the upstream end portion of the platform 34 of the nozzle 12.

The rim 57 of the flange 20 is spaced apart axially from the wall 66 of the nozzle so as to allow cooling air to pass into the enclosure 84. The downstream end of the wall 16 of the chamber is also separated by axial clearance 86 from the upstream end of the platform 34 of the nozzle 12 so as to discharge air from said enclosure 84, as described in greater detail below.

The outer gasket 70 includes means for bearing radially against the rim 57 of the flange 20 and against the upstream end portion of the outer platform 34 of the nozzle so as to center the gasket and prevent it from moving radially within the annular enclosure 84. The gasket 70 bears radially via the outer periphery of its upstream lip 72 against the rim 57 and via its middle portion 75 against the platform 34.

In the same manner, the inner gasket 70' is housed in an annular enclosure 84' defined on the upstream side by a radial annular portion of the flange 24, on the downstream side by a radial annular wall 66' of the inner platform 32 of the nozzle 12, on the inside by the upstream end portion of the platform 32, and on the outside by a cylindrical rim 57' of the flange 24. The rim 57' is separated from the platform 32 by axial clearance 86'. The gasket 70' bears via its inner periphery of its upstream lip 72 against the cylindrical rim 57' of the flange 24, and via its middle portion 75 against the upstream end portion of the platform 32 of the nozzle.

The gaskets 70 and 70' may be mounted in simple manner by moving each gasket in axial translation towards the nozzle 12 until the gasket bears axially against the upstream radial face of the wall 66, 66' of the corresponding platform of the nozzle (the gasket 70 then bearing against the outside surface of the platform 34 and the gasket 70' bearing against the inside surface of the platform 32). The nozzle 12 is then mounted at the outlet from the chamber and is fastened by appropriate means to the casings of the turbomachine. The gaskets 70 and 70' then bear axially against the radial portions of the corresponding flanges 20, 24 and they bear radially against the cylindrical rims 57, 57' of said flanges.

In operation, the gaskets 70, 70' may deform in the axial and radial directions so as to accommodate differential thermal expansions between the chamber 10 and the sectors of the nozzle 12. Nevertheless, they continue to bear continuously against the chamber and against the nozzle sectors. Each sector 80 of the downstream lip 74 of the gasket 70, 70' bears axially against a single nozzle sector and can therefore accommodate the movements of said sector of the nozzle 12 without being hindered by the adjacent lip or nozzle sectors.

The slots 76 in the downstream lip 74 are calibrated, i.e. their shapes and dimensions are determined in particular so as to allow a given flow of ventilation and cooling air to pass from the outside towards the inside of the chamber, said air coming from the compressor of the turbomachine, as mentioned above with reference to FIG. 1. This air then participates in controlled manner in the cooling of the gasket 70, 70' and also in the cooling of the upstream end portion of the corresponding platform 32, 34 of the nozzle 12.

In the variant embodiment of FIG. 6, the gaskets 70, 70' include calibrated orifices 88 for passing ventilation air, these orifices 88 being formed in this example through the downstream lip 74 of the gasket.

These gaskets 70, 70' bear radially solely against a cylindrical rim 90, 90' of the chamber 10, which rim extends downstream from the downstream end of the corresponding wall 14, 16 of the chamber. The outer gasket 70 bears axially inwards against the rim 90 of the outer wall 16, and the inner gasket 70' bears axially outwards against the rim 90' of the inner wall 14. The downstream end of the rim 90, 90' is separated from the upstream end of the platform of the nozzle 12 by axial clearance 92, 92' for discharging the ventilation air that passes through the orifices 88 and the slots 76 in the gasket.

The air that passes through the orifices 88 and the slots 76 in the gasket passes via the axial clearance 92, 92' to form a film of ventilation air that is injected at the radially inner and outer ends of the vanes 36 of the nozzle and that serves to flow along the platforms 32, 34 of the nozzle 12.

In the variant of FIG. 7, the rim 90 of the outer wall 16 of the chamber includes calibrated holes 94 for discharging the ventilation air. The two lips 72 and 74 of the gasket 70 here include calibrated orifices 88 for passing this air. The orifices 88 of the upstream lip 72 feed air to the holes 94 in the rim 90, and the orifices 88 and the slots 76 in the downstream lip 74 feed air to the axial clearance 92 between the rim 90 and the upstream end of the platform 34 of the nozzle.

In the variant of FIG. 8, the gasket 70 does not have orifices for passing ventilation air. The downstream end of the outer wall 16 of the chamber 10 and the inner periphery of the flange 20 include holes 94, 96 for passing ventilation air coming from the above-mentioned flow section 46 described with reference to FIG. 1. The holes 96 formed in the radial portion of the flange 20 open out into the annular enclosure 86 of the housing for the gasket 70 and feed air to the holes 94 formed in the downstream cylindrical rim 90 in the outer wall 16. The holes 96 formed in the outer wall 16, upstream from its rim 90, open out directly into the inside of the chamber.

Under such circumstances, the air that passes through the calibrated slot 76 of the downstream lip 74 in the gasket feeds the axial clearance 92 between the rim 90 and the upstream end of the platform 34 of the nozzle.

Figure 9:
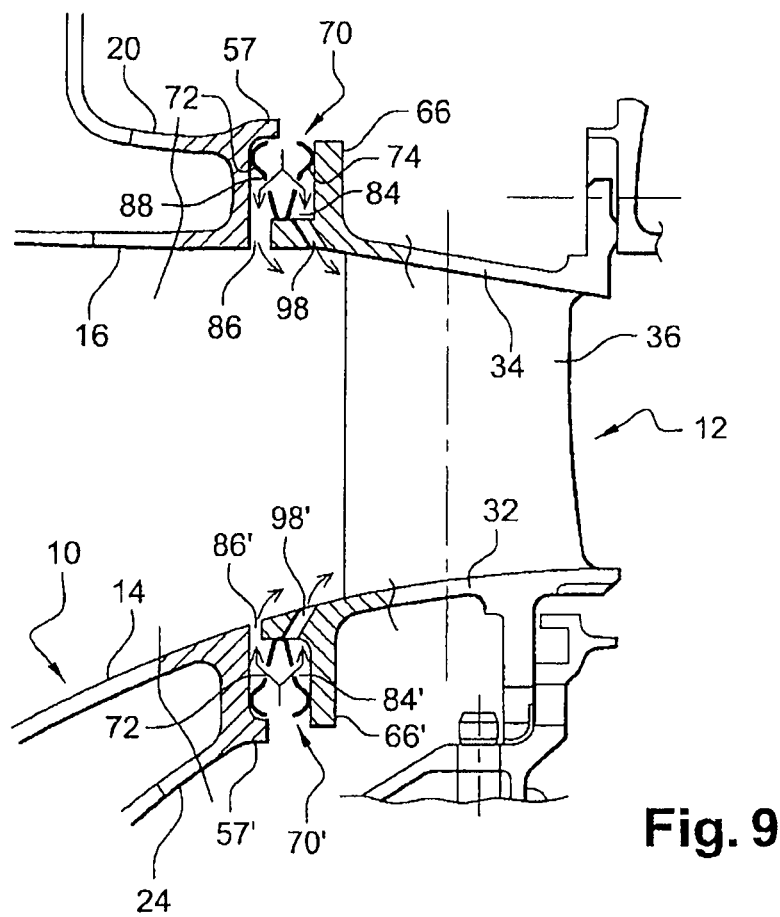

The variant embodiment of FIG. 9 differs from that of FIG. 3 in that the lips 72, 74 of the gaskets 70, 70' include calibrated air-passing orifices 88, the orifices in the upstream lip 72 feeding air to the axial clearance 86 between the chamber 10 and the nozzle 12, and the orifices in the downstream lip 74 feeding air to holes 98, 98' formed in the upstream end portion of the platform of the nozzle.

Figure 10:
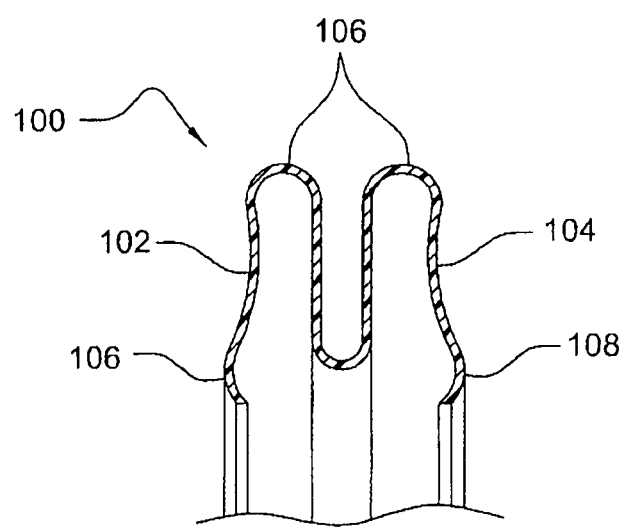
FIG. 10 is a diagrammatic half-view in axial section of another variant embodiment of the sealing gasket of the invention.

FIG. 10 is a diagrammatic half-view in axial section of a variant embodiment of the sealing gasket 100 of the invention. This gasket 100 presents a W-shaped section with its opening being radially open towards the inside. It comprises two annular lips, respectively an upstream lip 102 and a downstream lip 104 that are connected together by a middle portion 106 of the gasket that is itself corrugated. This gasket is also elastically deformable in the axial direction. In the proximity of their inner peripheries, the lips 102, 104 include axial bearing means 106, 108 of the above-described type. The downstream lip 104 is also split radially at a plurality of points to define a plurality of circumferential sectors of the above-described type.

In another variant that is not shown, the gasket of the invention may present a section that is WV- or WW-shaped, including a corrugated portion of the above-mentioned type that comprises a plurality of coaxial corrugations so as to improve the capacity of the gasket for elastic deformation in the axial direction.

In another variant that is not shown, the gasket may present a section that is Ω-shaped.

The invention claimed is:

1. A turbomachine comprising:
   an annular combustion chamber;
   a sectorized turbine nozzle comprising a plurality of nozzle sectors which are circumferentially arranged end to end, the sectorized turbine nozzle being disposed at an outlet from the chamber; and
   sealing means interposed axially between the chamber and the sectorized turbine nozzle,
   wherein the sealing means comprises an annular gasket that is axially resilient, the gasket including a first axial bearing means for axially bearing against a downstream end of the chamber and a downstream annular lip that is sectorized into a plurality of sectors such that adjacent sectors of the downstream lip are structurally separated from each other, each sector of the downstream lip being in alignment with a nozzle sector of the sectorized turbine nozzle and including a second axial bearing means for axially bearing against an upstream end of the nozzle sector of the sectorized turbine nozzle.

2. A turbomachine according to claim 1, wherein the gasket is mounted with cold axial prestress between the chamber and the sectorized turbine nozzle.

3. A turbomachine according to claim 1, wherein the first axial bearing means for bearing against the chamber includes an upstream annular lip of the gasket.

4. A turbomachine according to claim 3, wherein the first and second axial bearing means of the lips of the gasket comprise respective annular bearing surfaces of convex rounded shape.

5. A turbomachine according to claim 3, wherein the first and second axial bearing means of the lips of the gasket are formed at free end portions of the lips.

6. A turbomachine according to claim 3, wherein the lips of the gasket are connected together by a corrugated portion.

7. A turbomachine according to claim 1, wherein a downstream lip of the gasket includes a number of sectors that is equal to or greater than a number of nozzle sectors.

8. A turbomachine according to claim 7, wherein the adjacent sectors of the downstream lip are structurally separated from each other by calibrated through slots in the downstream lip.

9. A turbomachine according to claim 1, wherein the gasket comprises a single part.

10. A turbomachine according to claim 1, wherein the gasket presents a section that is V-, W-, WV-, WW-, or Ω-shape.

11. A turbomachine according to claim 1, wherein the gasket includes radial bearing means for bearing against at least one of the chamber or the nozzle for centering the gasket.

12. A turbomachine according to claim 1, wherein the gasket includes calibrated orifices for passing ventilation air.

13. A turbomachine according to claim 1, wherein at least one of the downstream end of the chamber or the upstream end of the nozzle includes air-passing orifices for at least one of feeding air to an annular enclosure in which the gasket is housed or for discharging air from the enclosure.

14. An axially-resilient annular sealing gasket for a turbomachine according to claim 1, the gasket made as a single part and including two annular lips, one of which includes radial through slots defining, between them, lip sectors that are configured to move freely independently of one another.

15. A gasket according to claim 14, presenting a section that is V-, W-, WV-, WW-, or Ω-shape.

16. A turbomachine according to claim 1, wherein the number of sectors of the downstream annular lip is equal to the number of nozzle sectors and presents an angular extent around an axis of the gasket which is substantially equal to an angular extent of the nozzle sector.

17. A turbomachine according to claim 8, wherein the slots are regularly distributed around an axis of the gasket.

18. A turbomachine according to claim 8, wherein at least one of the slots extends over about half of a radial dimension of the downstream lip.

\* \* \* \* \*